3,420,876
PROCESS FOR PREPARING 1-AMINO-3-CARBOXY-
PROPANE-2-SULFONIC ACID
Takashi Hayashi and Mitsutora Kondo, Tokyo, and
Michio Tanaka, Ohmiya-shi, Japan, assignors to
Kaken Kagaku Kabushiki Kaisha, Tokyo, Japan.
No Drawing. Sept. 21, 1967, Ser. No. 669,388
Claims priority, application Japan, Sept. 27, 1966,
41/63,244
U.S. Cl. 260—513    8 Claims
Int. Cl. C07c *143/12;* C07c *143/14*

ABSTRACT OF THE DISCLOSURE

A process for preparing 1-amino-3-carboxypropane-2-sulfonic acid and salts thereof which comprises reacting γ-phthalimidocrotonic acid with an alkali bisulfite, thereby forming a sulfonic acid derivative of γ-phthalimidocrotonic acid, and then hydrolyzing said derivative to 1-amino-3-carboxypropane-2-sulfonic acid.

This invention relates to a process for preparing 1-amino-3-carboxy-2-propane sulfonic acid.

The present inventors have found that 1-amino-3-carboxy-2-propane sulfonic acid is a useful remedy for epilepsy as it passes easily through the blood-brain-barrier and has a strong inhibitory action upon the limbic system of the mammalian brain. This compound was first synthesized when the present inventors, in the course of purification of γ-amino-β-hydroxybutyric acid which contains γ-aminocrotonic acid as the impurity, removed the latter after converting it into 1-amino-3-carboxypropane-2-sulfonic acid through subjection to the action of alkali bisulfite (specification of Japanese patent publication No. 24,365/1963). However, γ-amino-crotonic acid is expensive because the conventional process which consists of dissolving γ-amino-β-hydroxybutyric acid in concentrated sulfuric acid and heating the solution for intramolecular dehydration is unsatisfactory with a low yield.

The present inventors have found a new process for advantageously preparing 1-amino-3-carboxypropane-2-sulfonic acid from γ-phthalimidocrotonic acid which is obtained by reacting α-phthalimidoacetaldehyde with malonic acid ester, instead of using γ-aminocrotonic acid as the starting material. The present invention is therefore a process for preparing 1-amino-3-carboxypropane-2-sulfonic acid and salts thereof which comprises reacting γ-phthalimidocrotonic acid with an alkali bisulfite and by subjecting the product, if necessary, to the action of a mineral acid.

The reaction according to the process of the invention is formulated as follows:

In the practice of the present invention, γ-phthalimidocrotonic acid (I) is allowed to react with an alkali bisulfite, preferably in the form of a solution. If the reaction is carried out under pressure or at a relatively high temperature, not only the addition reaction of the alkali bisulfite but the hydrolysis of phthalimido group is also effected, thus giving the desired compound (II) in a single step. It is a new discovery that the hydrolysis of phthalimido group is accomplished under these conditions. This hydrolysis is considered attributable to the action of the sulfite itself, not to a simple acid catalytic action. A fact which seems to justify the presumption is that the hydrolysis is induced even by the addition of an alkali sulfite. If the addition reaction of alkali bisulfite is run in a moderate way, the hydrolysis of phthalimido group will not proceed sufficiently, and the reaction mixture will contain, in addition to the desired compound, a more or less percentage of 1-phthalimido-3-carboxy-2-propane-sulfonic acid (III) in the form of an alkali salt. Further hydrolysis with the addition of a mineral acid will permit the compound III to be converted into the compound II. In the alternative, the reaction mixture may be heated for a prolonged period of time or may be heat treated under pressure for the hydrolysis of phthalimido group, in either case without the addition of any mineral acid.

The substance obtained in accordance with the present invention has a marked inhibitory action upon the limbic system of the mammalian brain. When the cerebrums of adult dogs are electrically stimulated with a current of 70 v. for 10 seconds, generalized seizure appears and continues for 85 to 110 seconds. If, after the beginning of the seizure, one or two milliliter of a one-mol solution of the substance according to the invention are introduced into cerebrospinal space or into vein, the seizures are abolished within 10 to 15 seconds. This action is more efficacious than those of anticonvulsants heretofore known and, as indicated by the experimental data given above, the substance according to the invention is also characterized by great ease with which it can pass through the blood-brain-barrier.

EXAMPLE 1

Ten grams of γ-phthalimidocrotonic acid, 15 g. of potassium bisulfite, and 120 ml. of water are placed in a reactor, and allowed to react for 8 hours at 90 to 100° C. with stirring. The γ-phthalimidocrotonic acid which is initially suspended in the solution is dissolved with the progress of the reaction. In about 4 hours, the reaction solution becomes transparent. The solution is then concentrated in vacuo to dryness.

To the solid thus obtained is added 40 ml. of 28% hydrochloric acid, and the mixture is heated under reflux

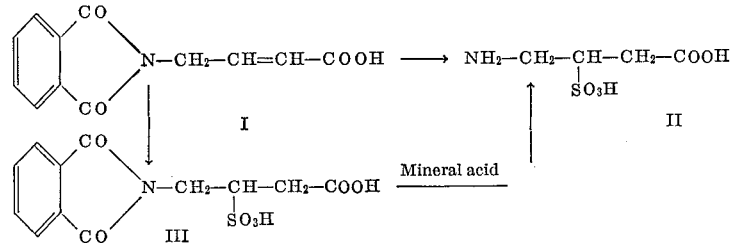

for 4 hours for hydrolysis. After cooling, phthalic acid and potassium chloride which have deposited are separated by filtration, the filtrate is concentrated in vacuo thereby removing hydrochloric acid thoroughly (therefrom), the residue is dissolved in water to a total volume of 150 ml., and then the pH of the solution is adjusted to 6. The resulting solution is caused to flow through a column packed with 100 ml. of a strongly acidic H-type ion exchange resin at a space velocity of 1. When the effluent and the washings of the column are concentrated in vacuo, a jelly-like substance is left behind. When allowed to stand, the residue crystallizes. The crude crystals are recrystallized from (7 ml.) water to give 4.2 g. of 1-amino-3-carboxypropane - 2 - sulfonic acid, M.P. 218°–223° C. It is separated by filtration and the filtrate, after the addition of acetone until it becomes slightly turbid, is allowed to stand. Then, 25 g. of the acid, M.P. 215°–223° C. is further obtained. The total yield is 6.7 g. (84%). The result of elementary analysis of the primary crystals (separated from water) is as follows:

Elementary analysis for $C_4H_9O_5NS$.—Calculated percent: C, 26.24; H, 4.92; N, 7.65; S, 17.50. Found percent: C, 26.40; H, 4.99; N, 7.55; S, 17.32.

Example 2

Ten grams of γ - phthalimidocrotonic acid, 15 g. of sodium bisulfite, and 120 ml. of water are placed in an autoclave, and reacted with stirring at 120° C. for 15 hours. Hydrochloric acid is added to the reaction mixture thereby adjusting the pH of the solution to 1.5. Next, the solution is concentrated in vacuo to 30 ml. About 5.5 g. of phthalic acid so separated is removed by filtration, and the filtrate is diluted to 150 ml. and the pH is adjusted to 6. The solution is caused to flow through a column packed with 200 ml. of a strongly acidic H-type ion exchange resin at a space velocity of 1. When the effluent and the washings from the column are concentrated in vacuo, a jelly-like substance is left behind. The residue is treated with 10 ml. hot water, insoluble phthalic acid is filtered off, and the resultant is allowed to stand after the addition of acetone to such an extent that the solution becomes slightly turbid. Then, 3.8 g. of 1 - amino - 3 - carboxypropane - 2 - sulfonic acid, M.P. 218°–223° C., is obtained. The product is filtered and the filtrate is allowed to stand after the addition of acetone again to such an extent that the filtrate becomes slightly turbid. Further 2.3 of the acid, M.P. 215°–223° C. is obtained. The total yield is 6.1 g. (77%).

Five grams of the crystals is dissolved in water, a sodium hydroxide solution is dropped into the aqueous solution to adjust the pH to 7, and the solution is concentrated in vacuo to 8 ml. The resulting solution yields 4.5 g. of sodium salt of 1 - amino - 3 - carboxypropane-2-sulfonic acid, M.P. 228°–234° C. upon standing after the addition of 50 ml. of ethanol.

We claim:
1. A process for preparing 1 - amino - 3 - carboxypropane - 2 - sulfonic acid and salts thereof, which comprises reacting γ - phthalimidocrotonic acid with an acidic alkali bisulfite at atmospheric pressure and at a moderate temperature and then hydrolyzing the 1-phthalimido - 3 - carboxypropane - 2 - sulfonic acid thus formed with a mineral acid.

2. The process according to claim 1, wherein said temperature is from about 90° C. to about 100° C.

3. The process according to claim 2, wherein the hydrolysis is carried out by heating the 1 - phthalimido-3-carboxypropane - 2 - sulfonic acid with said mineral acid under reflux.

4. The process according to claim 1, wherein the mineral acid is hydrochloric acid.

5. A process for preparing 1 - amino - 3 - carboxypropane - 2 - sulfonic acid and salts thereof, which comprises reacting γ - phthalimidocrotonic acid with an acidic alkali bisulfite under pressure thereby directly obtaining 1 - amino - 3 - carboxypropane - 2 - sulfonic acid and salts thereof.

6. The process according to claim 5, wherein the reaction is carried out at a temperature of 120° C.

7. A process for preparing 1 - amino - 3 - carboxypropane - 2 - sulfonic acid and salts thereof, which comprises reacting γ - phthalimidocrotonic acid with an acidic alkali bisulfite at a relatively high temperature thereby directly obtaining 1 - amino - 3 - carboxypropane - 2-sulfonic acid and salts thereof.

8. The process according to claim 7, wherein said temperature is 120° C.

References Cited
UNITED STATES PATENTS 2,383,130   8/1945   Jaeger et al. _____ 260—507

DANIEL D. HORWITZ, *Primary Examiner.*

U.S. Cl. X.R.

424—319